TECHNIQUE FOR THE PREPARATION OF ION IMPLANTED
TANTALUM-ALUMINUM ALLOY
Filed April 19, 1971

INVENTORS H. BASSECHES
D. GERSTENBERG
M. P. LEPSELTER
A. U. MAC RAE
J. M. SCHOEN
BY [signature]
ATTORNEY United States Patent Office 3,737,343

Patented June 5, 1973

3,737,343
TECHNIQUE FOR THE PREPARATION OF ION IMPLANTED TANTALUM-ALUMINUM ALLOY

Harold Basseches and Dieter Gerstenberg, Allentown, and Martin Paul Lepselter, Hanover Township, Pa., Alfred Urquhart MacRae, Berkeley Heights, N.J., and Joel Mark Schoen, Whitehall, Pa., assignors to Bell Telephone Laboratories, Incorporated, Murray Hill, N.J.

Filed Apr. 19, 1971, Ser. No. 135,178
Int. Cl. B44d *1/50*
U.S. Cl. 117—227 9 Claims

ABSTRACT OF THE DISCLOSURE

A technique for the preparation of tantalum-aluminum alloy films manifesting resistivities within the range of $10^{-3}$ to $10^{-2}$ ohm-centimeters which are stable at temperatures of the order of 400° C. involves depositing tantalum-aluminum alloy films by conventional condensation techniques, implanting nitrogen or oxygen ions in the deposited film and annealing the resultant assembly. The films so produced are the first high resistivity films to be made available for use in the fabrication of semiconductor devices which are normally subjected to temperatures ranging up to 400° C. during the processing sequence which manifest superior stability characteristics.

BACKGROUND OF THE INVENTION

(1) Field of the invention

This invention relates to a technique for the preparation of thin film components and to the resultant devices. More particularly, the present invention relates to a technique for the fabrication of thin film components including a condensed film of a tantalum-aluminum alloy having oxygen or nitrogen implanted therein by conventional ion implantation techniques, such components being of particular interest for use in thin film resistor applications.

(2) Description of the prior art

Miniaturization of components and circuitry coupled with the increasing complexity of modern electronic systems have created an unprecedented demand for reliability in thin film components. Furthermore, the extraordinary terrestrial and interplanetary environments created by the space age have further increased the severity of the problems associated with component reliability. Most of the requirements of stability, precision and miniaturization have been filled simultaneously by the use of tantalum components wherein elemental tantalum or a compound thereof has been utilized in the form of a thin film. Recently, however, it has been determined that tantalum-aluminum alloys are competitive with tantalum and, in terms of stability, are superior in many respects to either tantalum alone or in its compounded form.

Workers in the art soon recognized the exceptional stability characteristics of the tantalum-aluminum alloys and the wide range of resistive applications for which it is suitable. Studies have revealed that tantalum-aluminum alloys manifest superior stability characteristics at temperatures as high as 400° C., so suggesting its use as a resistor in the fabrication of semiconductor devices. Unfortunately, stable resistor materials such as the tantalum-aluminum alloys which manifest resistivities within the range of $10^{-3}$ to $10^{-2}$ ohm-centimeters have not been available heretofore for use in the fabrication of semiconductive devices which are normally subjected to processing temperatures within the range of 350 to 400° C.

SUMMARY OF THE INVENTION

In accordance with the present invention, these prior art limitations are effectively obviated by a novel processing technique wherein the resistivity of highly stable tantalum-aluminum alloy films is elevated to a desired level without altering companion properties by ion implantation techniques. Briefly, the inventive technique involves depositing a tantalum-aluminum alloy film upon a suitable substrate member by conventional condensation techniques, implanting either nitrogen or oxygen in the deposited film by ion bombardment techniques and subsequently annealing the implanted body.

BRIEF DESCRIPTION OF THE DRAWING

The invention will be more readily understood by reference to the following detailed description taken in conjunction with the accompanying drawing wherein.

DETAILED DESCRIPTION

Figure 1:
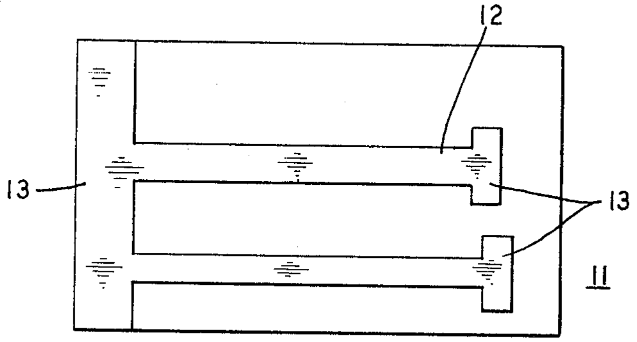
FIG. 1 is a plan view of a tantalum-aluminum alloy film prepared by cathodic sputtering techniques.
Figure 2:
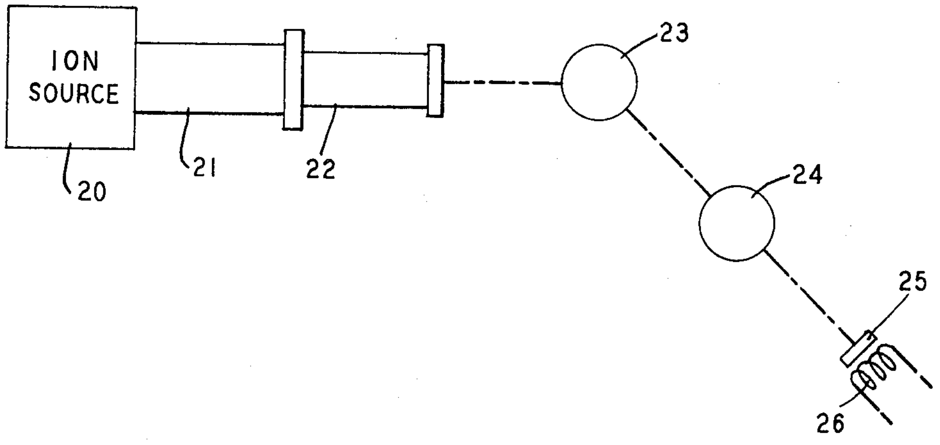
FIG. 2 is a schematic view of an apparatus suitable for use in ion implantation of the structure shown in FIG. 1.

With reference now more particularly to FIG. 1, there is shown a plan view of a structure prepared in accordance with the present invention. Shown in the drawing is a substrate member 11 upon which has been deposited a resistor pattern of a tantalum-aluminum alloy 12 by cathodic sputtering techniques well known to those skilled in the art. The sputtering apparatus employed in effecting this end includes a cathode configuration so constructed as to yield a tantalum-aluminum alloy film 12 containing from 25 to 75 atom percent aluminum, such range being dictated by considerations relating to the thermal oxidation resistance of the alloy. Typically, such configuration takes the form of a tantalum-aluminum cathode containing from 25 to 75 atom percent aluminum, a tantalum disk covered with aluminum or bearing machined strips of aluminum thereon. Termination pads 13 comprised of a suitable conductor are provided for the resistor. Structures so obtained are then subjected to a conventional ion implantation technique whereby oxygen or nitrogen ions are implanted in the tantalum-aluminum alloy film. The method used for the implantation process may conveniently be described by reference to FIG. 2.

The apparatus employed includes an ion source 20 for supplying oxygen or nitrogen ions. Ion sources are described more fully in "Methods of Experimental Physics" (edited by L. Martow), vol. 4, Part A (Academic Press, New York, N.Y.), pp. 256–283 (1967). In the operation of the implantation process, electrostatic or magnetic lenses (not shown) focus an ion beam into an accelerator column 21 which accelerates the ions to a desired predetermined energy. The ion beam traverses a drift tube 22 comprising an elongated member evacuated to a pressure of the order of $10^{-6}$ torr and passes through a mass separation magnet 23 which removes ion impurities from the beam. The beam direction is controlled by an *x–y* deflector 24 which directs the beam onto a desired region of target 25 which may be the structure shown in FIG. 1. The target 25 is mounted upon a support member (not shown) which is composed of a material that is stable under the conditions necessary to effect implantation, for example, stainless steel or molybdenum. A means 26 for heating the substrate to anneal out radiation damage is employed in a post implantation step.

As indicated, the ions of interest are accelerated to a desired predetermined energy or velocity for the purpose of assuring adequate penetration. Typically, it has been found acceptable to operate with accelerating potentials ranging from 50,000 to 300,000 volts. The accelerating potential utilized determines the depth of penetration of the ions of interest and variation thereof will clearly result in variations in the depth of penetration and in the concurrent control of the thickness of the implanted layer. For the purposes of the present invention the depth of penetration may vary from 400 to 2500 A., as desired. Studies have also revealed that a more uniform distribution of implanted ions may be obtained by bombardment with ions of progressively lower energies.

Finally, annealing of the resultant structure is effected at temperatures ranging from 500 to 700° C. to remove radiation damage.

Examples of the present invention are described in detail below. The examples are included merely to aid in the understanding of the invention and variations may be made by one skilled in the art without departing from the spirit and scope of the invention.

EXAMPLE 1

This example describes the fabrication of a nitrogen implanted tantalum-aluminum film resistor in accordance with the present inventive technique.

A cathodic sputtering apparatus including a tantalum cathode lined with stripes of aluminum in such fashion that the geometrical area of aluminum on the tantalum cathode was approximately 40 atom percent was employed. In the apparatus employed, the anode was floating, the potential difference being obtained by making the cathode negative with respect to ground.

The substrate selected was an 11/16" disk of silicon dioxide coated silicon. The vacuum chamber was initially evacuated to a pressure of the order of $1 \times 10^{-6}$ torr and argon admitted thereto at a pressure of 25 microns of mercury. A D-C voltage of approximately 4000 volts was impressed between the anode and cathode and sputtering conducted for 6 minutes, so yielding a layer of tantalum-aluminum alloy (containing) approximately 60 percent tantalum and 40 percent aluminum, 630 A. in thickness.

The sputtered tantalum-aluminum alloy was next coated with a 200 A. thick layer of titanium and a 5000 A. thick layer of gold and a desired resistor pattern generated therein by conventional techniques, so resulting in a structure similar to that shown in FIG. 1.

The titanium-gold contact areas of the structure were then shielded by means of a stainless steel mask and the back thereof coated with silver paint for the purpose of dissipating joule heat generated during the implantation process. The resultant structure was then placed in an apparatus of the type shown in FIG. 2 and ion implantation with nitrogen ions ($N_2^+$) effected to a depth of 630 A. in an ion accelerator by using a voltage of 150 kev. with a total integrated exposure of approximately $2 \times 10^{17}$ ampere-seconds per square centimeter.

Following implantation, the structure was annealed for one hour at 700° C. at a pressure of $10^{-6}$ torr to repair radiation damage in the film and to effect a uniform distribution of implanted ions through the depth of the film.

The implanted film was characterized by measuring sheet resistance at 1 kilohertz on an impedance comparator. The temperature coefficient of resistance was determined by resistance measurements at room and liquid nitrogen temperatures. The film thickness of the resistor was monitored by Talysurf traces of the film and the structural properties were studied by X-ray diffraction and electron micro-probe techniques.

The measurements so obtained revealed that the resistor prepared evidenced an initial sheet resistance of 30.5 ohms per square, 32.8 ohms per square after implantation and 37 ohms per square after annealing.

The procedure described above was repeated with minor variations, the results being set forth in the data below:

EXAMPLE 1 (results)

| | |
|---|---|
| Resistive film (atoms percent) | 60 Ta-40 Al. |
| Substrate | $SiO_2$-Si. |
| Implanted ion | $N_2^+$. |
| Ison dosage $10^{17}$/cm.$^2$ | 2.46 at 150 kev. |
| Ion range A. | 630. |
| Initial film thickness A. | 630. |
| Initial $R_s$ | 30.5 ohms/sq. |
| $R_s$ after implant | 32.8 ohms/sq. |
| $R_s$ after anneal | 37 ohms/sq. |
| TCR p.p.m./° C. | — |

EXAMPLE 2

| | |
|---|---|
| Resistive film (atoms percent) | 60 Ta-40 Al. |
| Substrate | $SiO_2$-Si. |
| Implanted ion | $N_2^+$. |
| Ion dosage $10^{17}$/cm.$^2$ | 1.64 at 150 kev. |
| Ion range A. | 630. |
| Initial film thicknesss A. | 630. |
| Initial $R_s$ | 27.2 ohms/sq. |
| $R_s$ after implant | 31.6 ohms/sq. |
| $R_s$ after anneal | 34.0 ohms/sq. |
| TCR p.p.m./° C. | — |

EXAMPLE 3

| | |
|---|---|
| Resistive film (atoms percent) | 60 Ta-40 Al. |
| Substrate | $SiO_2$-Si. |
| Implanted ion | $N_2^+$. |
| Ion dosage $10^{17}$/cm.$^2$ | 2.87 at 150 kev. |
| Ion range A. | 630. |
| Initial film thicknesss A. | 630. |
| Initial $R_s$ | 28.6 ohms/sq. |
| $R_s$ after implant | 31.6 ohms/sq. |
| $R_s$ after anneal | 34.0 ohms/sq. |
| TCR p.p.m./° C. | — |

EXAMPLE 4

| | |
|---|---|
| Resistive film (atoms percent) | 25 Ta-75 Al. |
| Substrate | quartz. |
| Implanted ion | $N_2^+$. |
| Ion dosage $10^{17}$/cm.$^2$ | 5.51. |
| Ion range A. | 400–1300. |
| Initial film thicknesss A. | 1500. |
| Initial $\rho$ | 695 microhm-cm. |
| $\rho$ after implant | 4100 microhm-cm. |
| $\rho$ after anneal | 4690 microhm-cm. |
| TCR p.p.m./° C. | —265. |

EXAMPLE 5

| | |
|---|---|
| Resistive film (atoms percent) | 25 Ta-75 Al. |
| Substrate | quartz. |
| Implanted ion | $N_2^+$. |
| Ion dosage $10^{17}$/cm.$^2$ | 4.83. |
| Ion range A. | 400–1300. |
| Initial film thicknesss A. | 1500. |
| Initial $\rho$ | 579 microhm-cm. |
| $\rho$ after implant | 2370 microhm-cm. |
| $\rho$ after anneal | 2370 microhm-cm. |
| TCR p.p.m./° C. | —231. |

EXAMPLE 6

| | |
|---|---|
| Resistive film (atoms percent) | 25 Ta-75 Al. |
| Substrate | quartz. |
| Implanted ion | $O_2^+$. |
| Ion dosage $10^{17}$/cm.$^2$ | 7.53. |
| Ion range A. | 400–1300. |
| Initial film thicknesss A. | 1500. |
| Initial $\rho$ | 690 microhm-cm. |
| $\rho$ after implant | 11,610 microhm-cm. |
| $\rho$ after anneal | 11,054 microhm-cm. |
| TCR p.p.m./° C. | —221. |

Analysis of the tabular data reveals that the resistors prepared in Examples 1 through 3 involve procedures in which the calculated projected ion range was the film-substrate interface. Study of the films revealed that at least one-half of the implanted ions penetrated the film entirely and were found lodged in the substrate. Reflectivity and X-ray diffraction studies indicated that the implanted regions were converted to the ca tantalum phase from the $\beta'$ phase.

In order to achieve a more uniform distribution of implanted ions, the structures fabricated in Examples 4 through 6 were bombarded with ions of progressively lower energies. It was observed that significant changes occurred in resistance and thickness prior to annealing, so suggesting that a more uniform distribution of implanted ions with depth in the film obtained. Additionally, the resistivty of the materials prepared in these examples was noted to change by a factor of approximately 20 without undergoing a concurrent significant change in the temperature coefficient of resistance.

We claim:

1. Technique for the preparation of a stable tantalum-aluminum thin film manifesting a resistivity within the range of $10^{-3}$ to $10^{-2}$ ohm-centimeters at temperatures of the order of 400° C. comprising the steps of (a) depositing a tantalum-aluminum film comprising from 25–75 atom percent aluminum upon a substrate member by condensation techniques, (b) implanting ions selected from the group consisting of nitrogen and oxygen in said film, and (c) annealing the implanted film to repair surface damage.

2. Technique in accordance with claim 1 wherein said film is deposited by cathodic sputtering techniques.

3. Technique in accordance with claim 1 wherein implantation is effected by accelerating ions toward the substrate through potentials ranging from 50,000 to 300,000 volts, the depth of penetration ranging from 400 A. to 2500 A.

4. Technique in accordance with claim 1 wherein said implanted ions are nitrogen.

5. Technique in accordance with claim 1 wherein said implanted ions are oxygen ions.

6. Technique in accordance with claim 1 wherein implantation is effected with ions of progressively lower energies in at least two stages.

7. Technique in accordance with claim 4 wherein said tantalum-aluminum film comprises 60 atom percent tantalum–40 atom percent aluminum.

8. Technique in accordance with claim 7 wherein annealing is effected at a temperature within the range of 500 to 700° C.

9. Ion implanted tantalum-aluminum thin film comprising from 25–75 atom percent aluminum, remainder tantalum, said ion being selected from the group consisting of oxygen and nitrogen.

References Cited

UNITED STATES PATENTS

| | | | |
|---|---|---|---|
| 3,242,006 | 3/1966 | Gerstenberg ______ | 117—106 R |
| 3,341,352 | 9/1967 | Ehlers _____________ | 117—93.3 |
| 3,607,384 | 9/1971 | Banks ____________ | 117—106 R |
| 3,627,577 | 12/1971 | Steidel _____________ | 117—227 |

ALFRED L. LEAVITT, Primary Examiner

J. H. NEWSOME, Assistant Examiner

U.S. Cl. X.R.

117—62, 93.3, 106 R; 204—157. 1, 192

UNITED STATES PATENT OFFICE
CERTIFICATE OF CORRECTION

Patent No. 3,737,343 Dated June 5, 1973

Inventor(s) Harold Basseches et al.

It is certified that error appears in the above-identified patent and that said Letters Patent are hereby corrected as shown below:

Column 4, line 5, "Ison" should read -- Ion --; line 47, "____265" should read -- -265 --; line 59, "____231" should read -- -231 --; line 71, "11,054" should read -- 13,054 --; line 73, "____221" should read -- -221 --. Column 5, line 6, "ca" should read -- bcc --; line 9, "Examples" should read -- Example --.

Signed and sealed this 1st day of January 1974.

(SEAL)
Attest:

EDWARD M.FLETCHER,JR.
Attesting Officer

RENE D. TEGTMEYER
Acting Commissioner of Patents